(12) United States Patent
Little (10) Patent No.: US 8,620,965 B2
(45) Date of Patent: Dec. 31, 2013

(54) DYNAMIC CONFIGURATION OF SERVICES USING A SYNDICATION FEED

(75) Inventor: Mark Cameron Little, Ebchester (GB)

(73) Assignee: Red Hat, Inc., Raleigh, NC (US)

( * ) Notice: Subject to any disclaimer, the term of this patent is extended or adjusted under 35 U.S.C. 154(b) by 475 days.

(21) Appl. No.: 12/200,722

(22) Filed: Aug. 28, 2008

(65) Prior Publication Data

US 2010/0057680 A1 Mar. 4, 2010

(51) Int. Cl.
*G06F 17/30* (2006.01)

(52) U.S. Cl.
USPC .............................. 707/802; 709/202; 709/205

(58) Field of Classification Search
USPC .................................. 709/202, 205; 707/802
See application file for complete search history.

(56) References Cited

U.S. PATENT DOCUMENTS

2008/0301175 A1* 12/2008 Applebaum et al. .......... 707/102
2009/0292773 A1* 11/2009 Leedberg et al. ............. 709/205

OTHER PUBLICATIONS

"HP OpenView Server Configuration Management Data Sheet," Sep. 2005. Copyright 2005. 8 pages. 4AA0-2480ENW Hewlett-Packard Development Company LP downloaded off internet site http://www.managementsoftware.hp.com /solutions /server.
Snell, James, "An Overview of the Atom 1.0 Syndication Format" Aug. 2, 2005. 9 pages. IBM http://www.ibm.com/developerworks/xml/library/x-atom10.html.
Snell, James, "Getting to Know the Atom Publishing Protocol, Part I: Create and Edit Web Resources with the Atom Publishing Protocol" Oct. 17, 2006. 9 pages. IBM http://www.ibm.com/developerworks/library/x-atompp1/.
Snell, James, "Getting to Know the Atom Publishing Protocol, Part 2: Put the Atom Publishing Protocol to Work" Nov. 7, 2006. 10 pages. IBM http://www.ibm.com/developerworks/library/x-atompp2/.
King, Erik, "Perpetual Enterprise Management Service (PEMS) for Next Generation SOA-based Command & Control Systems", Jun. 2005, 26 pages.
King, Erik, "Perpetual Enterprise Management Service (PEMS) for C2 SOA Deployments", Jun. 14, 2005, 23 pages.

\* cited by examiner

*Primary Examiner* — Huawen Peng
(74) *Attorney, Agent, or Firm* — Lowenstein Sandler LLP (57) ABSTRACT

A configuration file is received by a publish-subscribe service and published to a syndication feed. The received configuration file is associated with a class of services. The configuration file is then sent to subscribers of the syndication feed. The subscribers of the syndication feed belong to the class of services. Upon receiving the configuration file, the subscribers are automatically reconfigured.

17 Claims, 6 Drawing Sheets

DYNAMIC CONFIGURATION OF SERVICES USING A SYNDICATION FEED

TECHNICAL FIELD

Embodiments of the present invention relate to distributed systems, and more specifically to dynamically configuring services of a distributed system using a syndication feed.

BACKGROUND

Electronic devices and software programs (e.g., user applications, server processes, operating systems, services, etc.) typically include a configuration file that provides the initial settings of the device or program. To change the way that the device or program operates, a user or application can modify the settings of the configuration file. In conventional distributed systems, configuration files are updated and/or replaced manually. For example, a system administrator logs in to a server that hosts a service, and edits a configuration file for the service, or uploads a new configuration file for the service. In large distributed systems, the system administrator may be required to log in to multiple different servers, and update the configuration files to many services. This can be a time consuming and laborious process.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for distributing configuration files to services, such as services of distributed computing systems. In one embodiment, a configuration file that is associated with a class of services is received by a publish-subscribe service. The configuration file is published to a syndication feed that is hosted by the publish-subscribe service. The configuration file is then sent to subscribers of the syndication feed. In one embodiment, the configuration file is automatically pushed to the subscribers by the publish-subscribe service. In another embodiment, the configuration file is downloaded by the subscribers of the syndication feed. Upon receiving the configuration file, the subscribers are automatically reconfigured.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "sending", "receiving", "pushing", "pulling" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals, etc.)), etc.

Figure 1:
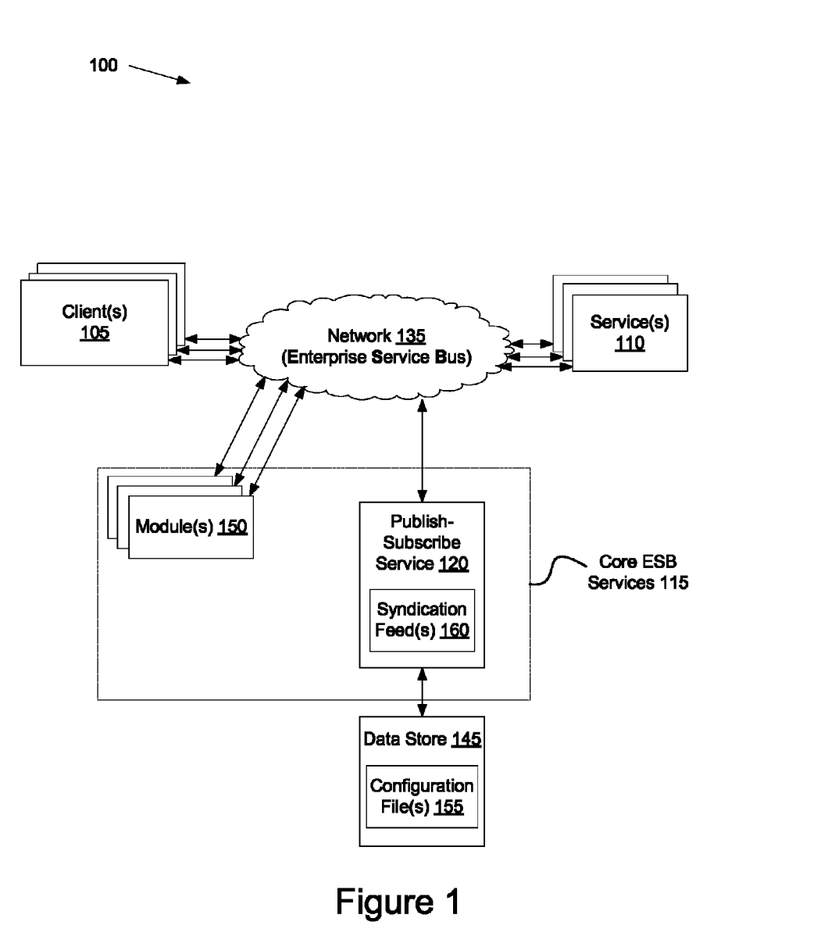
FIG. 1 illustrates an exemplary distributed system, in which embodiments of the present invention may operate.

FIG. 1 illustrates an exemplary distributed computing system 100, in which embodiments of the present invention may operate. In one embodiment, the distributed computing system 100 includes a service oriented architecture (SOA). A service oriented architecture (SOA) is an information system architecture that organizes and uses distributed capabilities (services) for one or more applications. SOA provides a uniform means to offer, discover, interact with and use capabilities (services) distributed over a network. Through the SOA, applications may be designed that combine loosely coupled and interoperable services.

The distributed computing system 100 may include clients 105 and services 110, connected via a network 135. The network 135 may be a public network (e.g., Internet), a private network (e.g., Ethernet or a local area Network (LAN)), or a combination thereof. In one embodiment, the network 135 includes an enterprise service bus (ESB). An ESB is an event-driven and standards-based messaging engine that provides services for more complex architectures. The ESB provides an infrastructure that links together services 110 and clients 105 to enable distributed applications and processes. The ESB may be implemented to facilitate an SOA. In one embodiment, the ESB is a single bus that logically interconnects all available services and clients. Alternatively, the ESB may include multiple busses, each of which may logically interconnect different services and/or clients.

Clients 105 may be, for example, personal computers (PC), palm-sized computing devices, personal digital assistants (PDA), etc. Clients 105 may also be applications run on a PC, server, database, etc. In the SOA, clients 105 include applications that access services 110. Clients 105 may be fat clients (clients that perform local processing and data storage), thin clients (clients that perform minimal or no local processing and minimal to no data storage), and/or hybrid clients (clients that perform local processing but little to no data storage).

Services 110 may be discretely defined sets of contiguous and autonomous functionality (e.g., business functionality, technical functionality, etc.). Services 110 may be resident on personal computers (PC), servers, routers, etc. Each service 110 may represent a process, activity or other resource that can be accessed and used by other services or clients on network 135. Each service 110 may be independent of other services 110, and may be accessed without knowledge of its underlying platform implementation.

In an example for a business function of "managing orders," services may include, for example, create order, fulfill order, ship order, invoice order, cancel/update order, etc. Each such service may be autonomous from the other services that are used to manage orders, and may be remote from one another and have different platform implementations. However, the services may be combined and used by one or more applications to manage orders.

In one embodiment, the distributed computing system 100 includes an ESB that has a collection of core ESB services 115. The core ESB services 115 are specialized services that enhance and/or enable functionality of the ESB. Messages can be directed towards any of the core ESB services 115, and/or the core ESB services 115 can act on messages that flow through the ESB. Any of the core ESB services 115 may include one or more general purpose computing devices (e.g., personal computer or server) and/or a special purpose computing devices configured to act on messages that flow between message producers (e.g., clients or services) and message consumers (e.g., clients or services) within the ESB.

The core ESB services 115 may include one or more modules 150, each of which may be a service of the ESB. Examples of modules 150 include modules that provide services for redirecting a message from an original intended endpoint, splitting a message into multiple messages, combining multiple messages into a single message, transforming messages from a first format to a second format, applying rules to a message, storing copies of messages, providing a registry of available services, etc. Each module 150 may provide a service to clients 105 and/or services 110 of the distributed computing system 100.

In one embodiment, the core ESB services 115 include a publish-subscribe service 120 that manages the distribution of configuration files among services 110 and core ESB services 115 in the distributed computing system 100. The publish-subscribe service 120 is connected to a data store 145, on which the publish-subscribe service 120 stores configuration files 155. Data store 145 may include a file system, a database, or other data storage arrangement. In one embodiment, data store 145 is internal to a server that hosts the publish-subscribe service 120. Alternatively, data store 145 may be external to the server that hosts the publish-subscribe service 120, and connected with the server either directly or via a network.

Configuration files 155 contain information that a service 110, 115 uses to configure itself. Examples of information included in a configuration file 155 include ports to listen in on, where to store downloads, a location of a home directory, access privileges, etc. Configuration files may be high level configuration files (e.g., of messaging services, web servers, application servers, etc.) or lower level configuration files (e.g., of airline booking services, banking services, particular message transports, security protocols, etc.). For example, an ESB configuration file may specify a transport mechanism (file transfer protocol (FTP), hypertext transfer protocol (HTTP), etc.), what time of day particular services are available, who is allowed to see or use particular services, etc. A messaging service configuration file, on the other hand, may specify security settings (who can view a message, who can access a particular message queue, etc.), default queues, where the service is located, what type of information the service supports (e.g., text messages, binary messages, etc.), whether the service uses transactional messages, etc. A configuration file for a web server (e.g., an Apache Tomcat™ server or Microsoft® Internet Information Server) may include, for example, a port number, access control, where to store incoming files, security settings, etc. An airline booking service configuration file may specify, for example, a blacklist of clients that are not able to book flights, airlines that the booking service provides flight reservations for, etc. A banking service may specify accounts that can be managed online, security requirements, and so on.

A file format of a configuration file 155 may depend on the type of service being configured, an operating system on which the service runs, a programming language used to write the service, etc. Configuration files 155 are typically a form of American Standard Code for Information Interchange (ASCII) file that can be edited using a text editor. For example, the configuration files 155 used by Microsoft's® Internet Information Services (IIS) are XML formatted files, which can be edited with a text editor. Common formats for configuration files 155 include the extensible markup language (XML) and YAML (YAML Ain't A Markup Language).

Services 110, 115 read configuration files 155 at startup to determine operating settings. Some services 110, 115 can also periodically check the configuration files 155 for changes (e.g., by taking a hash of the configuration file at a first point in time, taking a hash of the configuration file at a second point in time, and comparing the hashes). Additionally, some services 110, 115 can re-read configuration files 155 and apply any changes reflected in the configuration files 155, and/or read a different configuration file 155 upon receiving a command to do so. Some configuration file changes can be implemented while a service 110, 115 is running, while other changes may require the service 110, 115 to restart.

The publish-subscribe service 120 distributes configuration files 155 to services 110, 115 using a publish-subscribe model. In a publish-subscribe model, an entity publishes information to a node at a publish subscribe service, and the publish-subscribe service propagates the information to all entities that are authorized to receive the information. The publish-subscribe service 120 includes multiple different syndication feeds 160 (otherwise known as channels or nodes). Each syndication feed 160 is associated with a distinct category of service. For example, a first syndication feed may be associated with ESBs, a second syndication feed may be associated with application servers, a third syndication feed may be associated with messaging services, and so on. Each of the services 110, 115 may subscribe to a syndication feed 160 provided by the publish-subscribe service 120 that is appropriate to that service. For example, a messaging service may subscribe to a messaging syndication feed, an application server may subscribe to an application server syndication feed, and so on. Configuration files 155 can be published to syndication feeds 160, and then distributed to subscribing services 110, 115.

Configuration files 155 can be published to one or more syndication feeds 160. For example, configuration files 155 can be uploaded to a syndication feed 160 on the publish-subscribe service 120 by a system administrator. Whenever a new configuration file 155 is added to a syndication feed 160, services 110, 115 that subscribe to that feed can download the configuration file 155, or the configuration file 155 can be automatically transmitted to the subscribing service. The configuration file 155 can then cause the services 110, 115 to reconfigure themselves. Therefore, a system administrator is able to modify the configuration of multiple services 110, 115 by publishing a single configuration file 155 to a syndication feed 160 of the publish-subscribe service 120.

A configuration file 155 can be changed numerous times during a service's life, even if the service 110, 115 does not otherwise change. For example, configuration files 155 may be changed in response to software updates (binary files that modify a program's code), or may be changed in the absence of software updates.

In one embodiment, the publish-subscribe service 120 uses the Atom Syndication Format. The Atom Syndication Format defines a structure for syndication feeds and information that can be published in syndication feeds. In the Atom Syndication Format, each of the syndication feeds 160 is represented by an Atom feed document. Configuration files 155 can be published to an Atom feed document as a payload of an Atom entry document. Atom entry documents can include multiple different types of data, including plain text, escaped hypertext markup language (HTML), well-formed HTML, arbitrary extensible markup language (XML), and binaries. Moreover, Atom entry documents can include pointers to additional content that is not directly included in a syndication feed 160, and can reference additional content by a universal resource identifier (URI).

In one embodiment, the publish-subscribe service 120 distributes configuration files 155 to a service 110, 115 upon being polled by that service 110, 115. In a further embodiment, the publish-subscribe service 120 manages configuration files 155 and distributes configuration files 155 to services 110, 115 using the Atom Publishing Protocol (AtomPub). The Atom Publishing Protocol is an application-level protocol for content publishing and management using HTTP and XML. The Atom Publishing Protocol provides facilities for creating, editing, deleting and distributing resources. The Atom Publishing Protocol enables resources to be managed and published as collections of resources, which may or may not be hierarchically arranged. If AtomPub is used, services 110, 115 can retrieve configuration files 155 from the publish-subscribe service 120 using standard HTTP commands by polling the publish-subscribe service 120.

In another embodiment, the publish-subscribe service 120 distributes configuration files 155 to services 110, 115 that subscribe to a syndication feed 160 automatically when new configuration files 155 are published to that syndication feed 160. In one embodiment, configuration files 155 are pushed to subscribing services 110, 115 via email. Alternatively, the publish-subscribe service 120 may transport configuration files 155 over the Extensible Messaging and Presence Protocol (XMPP). For example, configuration files 155 may be pushed to subscribing services using a combination of XMPP and an XMPP publish-subscribe protocol extension. When a new configuration file is published to a syndication feed 160, the publish-subscribe service 120 automatically sends the new configuration file to services 110, 115 that subscribe to the syndication feed 160 using XMPP. As a result, services 110, 115 may receive new configuration files 155 almost immediately upon those configuration files 155 being published to a syndication feed 160. In one embodiment, the configuration files 155 are encapsulated in the Atom feed format.

In one embodiment, some services 110, 115 subscribe to multiple syndication feeds 160, each of which may be associated with a specific category of service. The configuration files 155 provided by each of the syndication feeds 160 may modify configuration of a specific component or components of the subscribing services 110, 115. For example, a service 110, 115 may subscribe to a message transport syndication feed, a port syndication feed, a security syndication feed, etc. In another example, a service may subscribe to a general syndication feed for most things, and a separate finer grained syndication feed for, e.g., a specific transport mechanism. For example, a messaging service may subscribe to a messaging service syndication feed and an HTTP message transport syndication feed.

Services 110, 115 that subscribe to multiple syndication feeds 160 may occasionally receive configuration files 155 that conflict. For example, a first configuration file may specify that FTP messages are to use only port 2020, while a second configuration file may specify that FTP messages are to use only port 1024. In one embodiment, services 110, 115 are able to prioritize configuration files 155, and apply the settings of one configuration file over another. Configuration files 155 may themselves include a priority rank. Alternatively, the services 110, 115 may apply a priority rank to the configuration files 155 (e.g., based on a title of the configuration file 155 and/or contents of the configuration file 155). By prioritizing configuration files 155, services 110, 115 are able to resolve any conflicts that arise between different configuration files 155.

Figure 2:
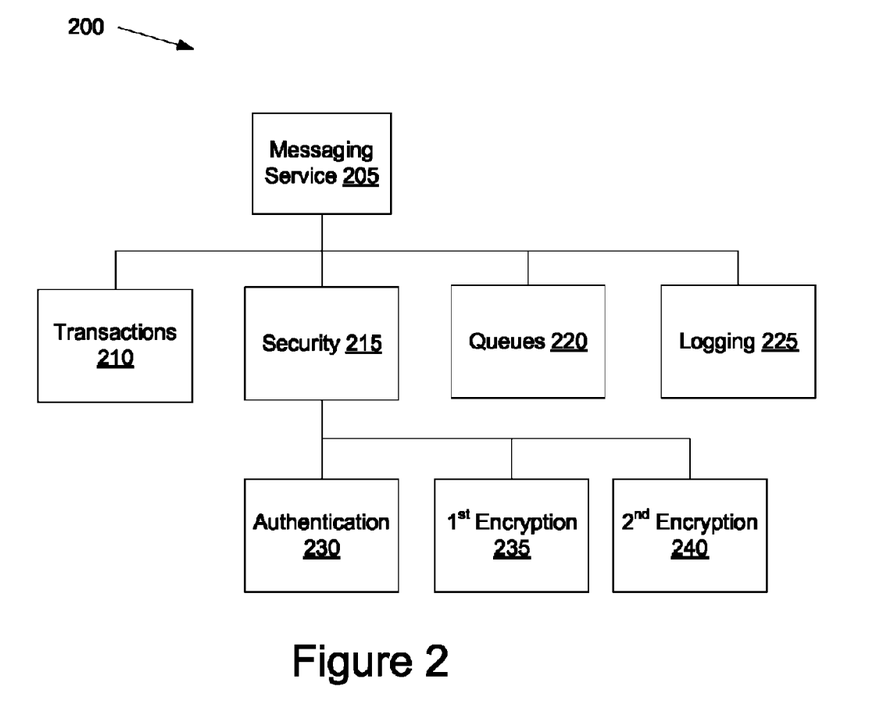
FIG. 2 illustrates an example hierarchical arrangement of syndication feeds, in accordance with one embodiment of the present invention.

FIG. 2 illustrates an example hierarchical arrangement of syndication feeds 200, in accordance with one embodiment of the present invention. In the hierarchical arrangement of syndication feeds 200, a syndication feed that has children is referred to as a collection node, and a syndication feed that has no children is referred to as a leaf node. In the example hierarchical arrangement of syndication feeds 200, a highest level syndication feed is a messaging service syndication feed 205. The messaging service syndication feed 205 has four children syndication feeds: a transactions syndication feed 225, a security syndication feed 215, a queues syndication feed 220 and a logging syndication feed 225. The security syndication feed 215 further includes three children syndication feeds: an authentication syndication feed 230, a first encryption syndication feed 235 and a second encryption syndication feed 240. The messaging service syndication feed 205 and the security syndication feed 215 are collection nodes, while the remaining syndication feeds are leaf nodes.

In one embodiment, if a service subscribes to a syndication feed that is higher in the hierarchy, then the service automatically subscribes to all categories that are children of that syndication feed. For example, if a service subscribes to the messaging service syndication feed 205, the service automatically subscribes to all other syndication feeds illustrated in the hierarchy. In another embodiment, a service does not automatically subscribe to children of a syndication feed. In such an embodiment, a service only receives configuration files that are published to those syndication feeds in the hierarchy to which the service has specifically subscribed.

In one embodiment, no configuration files are published to collection nodes. Configuration files are instead published to leaf nodes that are children of the collection node. A syndication feed that is a collection node then provides all configuration files that are published to its children. Alternatively, configuration files may be posted to collection nodes. In such an embodiment, a parent syndication feed (collection node) may include general configuration settings for multiple different components. For example, a configuration file published to the messaging service syndication feed 205 may include transactions settings, security settings, queue settings, and so on. The children syndication feeds may include different settings for those components. The different settings may be alternative settings that are preferred by a minority of system administrators. In one embodiment, configuration files of lower level syndication feeds (e.g., leaf nodes) have a higher priority than configuration files of higher level syndication feeds (e.g., collection nodes). Therefore, the settings provided by a child syndication feed can override settings provided by a parent syndication feed.

Figure 3A:
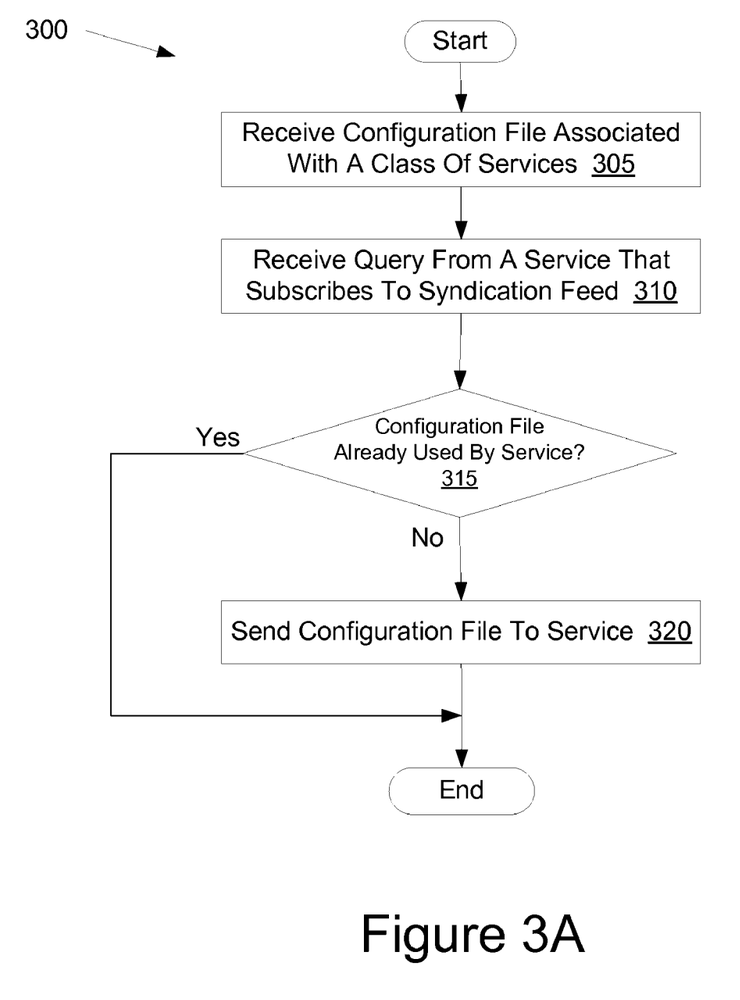
FIG. 3A illustrates a flow diagram of one embodiment for a method of distributing configuration files to a service.

FIG. 3A illustrates a flow diagram of one embodiment for a method 300 of distributing configuration files to a service. The method may be performed by processing logic that may comprise hardware (e.g., circuitry, dedicated logic, programmable logic, microcode, etc.), software (such as instructions run on a processing device), or a combination thereof. In one embodiment, method 300 is performed by publish-subscribe service 120 of FIG. 1.

Referring to FIG. 3A, at block 305 a publish-subscribe service receives a configuration file associated with a class of services. The configuration file is published to a syndication feed hosted by the publish-subscribe service.

At block 310, the publish-subscribe service receives a query from a service that subscribes to the syndication feed to which the configuration file has been published. The query may be sent by the service to determine whether any new configuration files have been published to the syndication feed. In one embodiment, the query is received via HTTP.

At block 315, the publish-subscribe service determines whether the configuration file is already used by the service. In one embodiment, such a determination is made be checking a log of configuration files that have been sent to the service. Alternatively, the service may indicate a current configuration file that is used by the service in the query. If the configuration file is not currently used by the service, the publish-subscribe service sends the configuration file to the service. If the configuration file is already used by the service, the method ends.

Figure 3B:
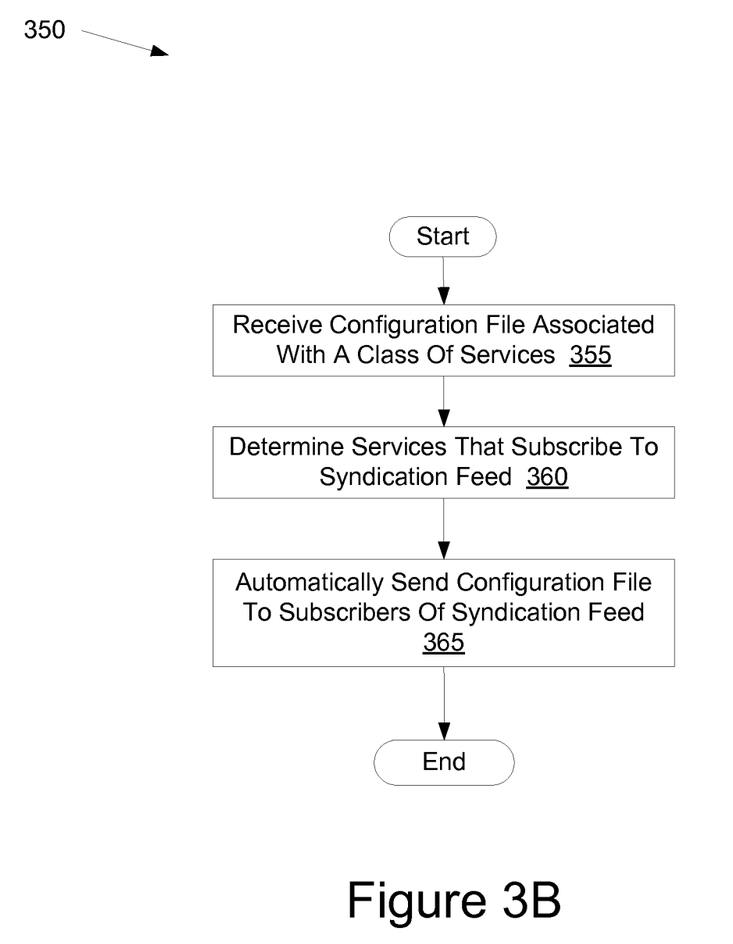
FIG. 3B illustrates a flow diagram of another embodiment for a method of distributing configuration files to a service.

FIG. 3B illustrates a flow diagram of another embodiment for a method 350 of distributing configuration files to a service. The method may be performed by processing logic that may comprise hardware (e.g., circuitry, dedicated logic, programmable logic, microcode, etc.), software (such as instructions run on a processing device), or a combination thereof. In one embodiment, method 350 is performed by publish-subscribe service 120 of FIG. 1.

Referring to FIG. 3B, at block 355 a publish-subscribe service receives a configuration file associated with a class of services. The configuration file is published to a syndication feed hosted by the publish-subscribe service.

At block 360, the publish-subscribe service determines what services subscribe to the syndication feed to which the configuration file has been published. At block 365, the publish-subscribe service automatically sends the configuration file to subscribers of the syndication feed. The configuration file may be broadcast to subscribers using XMPP and an XMPP publish-subscribe protocol extension. Alternatively, the configuration file may be send to the service via email. The method then ends.

Figure 4:
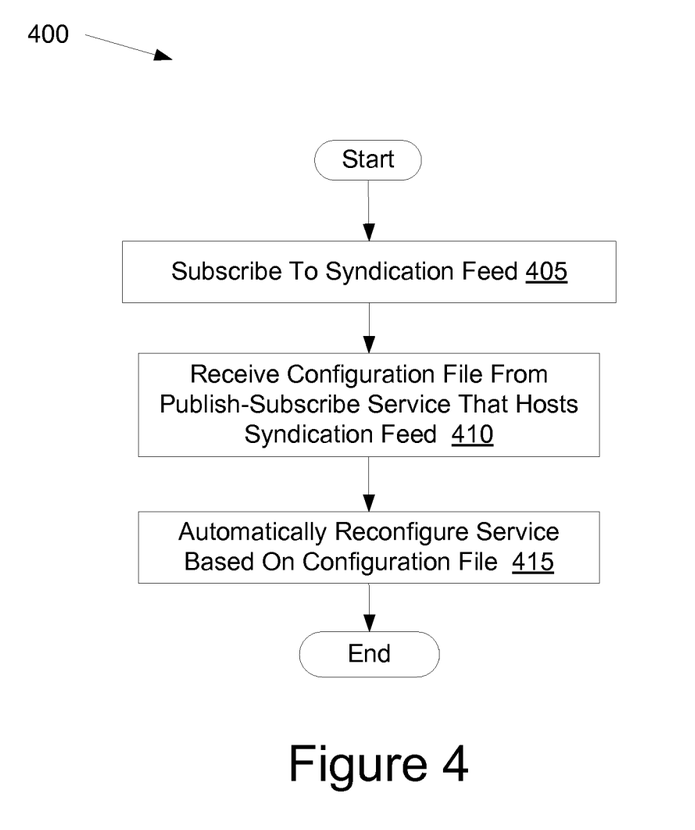
FIG. 4 illustrates a flow diagram of one embodiment for a method of updating a configuration of a service.

FIG. 4 illustrates a flow diagram of one embodiment for a method 400 of updating a configuration of a service. The method may be performed by processing logic that may comprise hardware (e.g., circuitry, dedicated logic, programmable logic, microcode, etc.), software (such as instructions run on a processing device), or a combination thereof. In one embodiment, method 400 is performed by a service 110 or a core ESB service 115 of FIG. 1.

Referring to FIG. 4, at block 405 a service subscribes to a syndication feed. The syndication feed provides configuration files for a specific class of services to which the service belongs.

At block 410, the service receives a configuration file from a publish-subscribe service that hosts the syndication feed. The service may periodically poll the publish-subscribe service to determine whether a new configuration file has been published to the syndication feed. Alternatively, the service may automatically receive new configuration files that have been published to the syndication feed from the publish-subscribe service. For example, if the publish-subscribe service uses XMPP, new configuration files may be automatically received. The service may also automatically receive a notification that a new configuration file has been published. Based on the received notification, the service can then download the configuration file from the publish-subscribe service.

At block 415, the service automatically reconfigures itself based on the configuration file. The method then ends.

Figure 5:
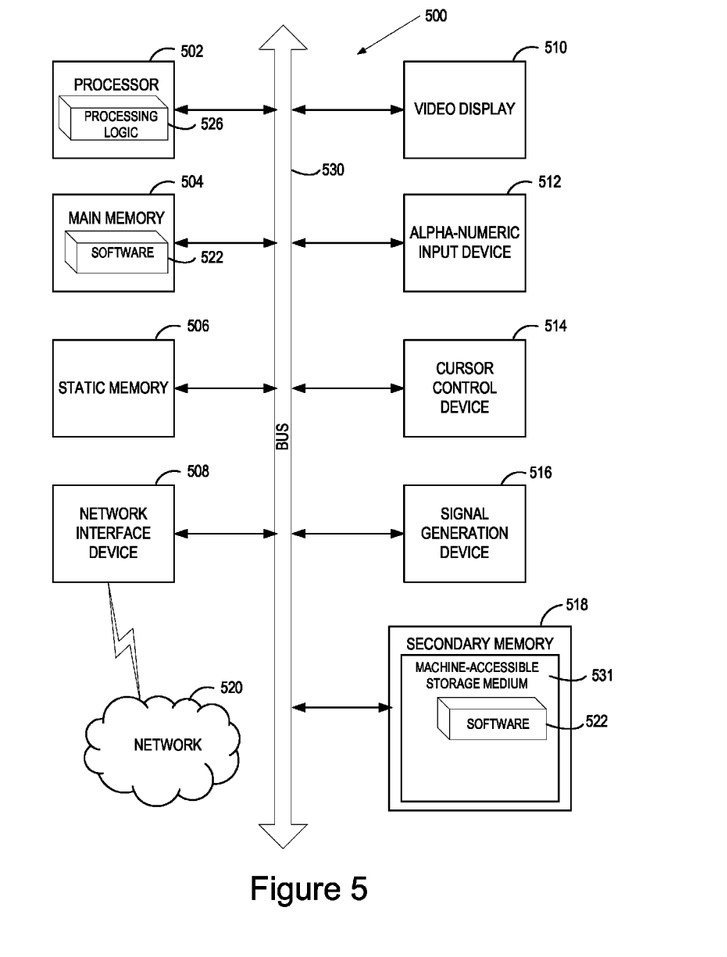
FIG. 5 illustrates a block diagram of an exemplary computer system, in accordance with one embodiment of the present invention.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine.

Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 518 (e.g., a data storage device), which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The secondary memory 518 may include a machine-readable storage medium (or more specifically a computer-readable storage medium) 531 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-readable storage media. The software 522 may further be transmitted or received over a network 520 via the network interface device 508.

The machine-readable storage medium 531 may also be used to store the publish-subscribe service 120 and/or services 110 of FIG. 1, and/or a software library containing methods that call the publish-subscribe service 120 and/or services 110. While the machine-readable storage medium 531 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A computer implemented method, comprising:
   obtaining, by a processing device, a configuration file, wherein at least a portion of content within the configuration file is published to a syndication feed and wherein the configuration file and the syndication feed are associated with a class of services in a distributed computing system;
   sending, by the processing device, the portion of the content within the configuration file to subscribers of the syndication feed, wherein the subscribers comprise one or more services associated with the class of services and wherein the portion of the content within the configuration file causes the subscribers to be reconfigured;
   receiving a query from a service that subscribes to the syndication feed; and
   sending the portion of the content within the configuration file to the service in response to the query if the configuration file is different from an existing configuration file used by the service.

2. The method of claim 1, wherein the syndication feed is an Atom feed.

3. The method of claim 1, further comprising:
   pushing the configuration file to the one or more subscribers of the syndication feed upon receiving the configuration file.

4. The method of claim 3, wherein the service uses an extensible messaging and presence protocol (XMPP) and an XMPP publish-subscribe extension protocol to transport the configuration file.

5. The method of claim 1, wherein all services of the class of services within a distributed system subscribe to the syndication feed.

6. A computing apparatus, comprising:
   a memory to store data;
   a processing device coupled with the memory;
   a network interface to communicate with a plurality of services of a distributed system; a data store;
   a service, coupled with the data store and the network interface, and executable by the processing device, to obtain a configuration file, wherein at least a portion of content within the configuration file is published to a syndication feed and wherein the configuration file and the syndication feed are associated with a class of services in the distributed computing system, to store the one or more configuration files in the data store, and to send the portion of the content within the configuration file to subscribers of the syndication feed via the network interface, wherein the subscribers comprise one or more services associated with the class of services and wherein the portion of the content within the configuration file causes the subscribers to be reconfigured; and
   a subscribing service, executed by the processing device, that subscribes to the syndication feed, the subscribing service to poll the service to determine if any configuration file has been published since a last time that the subscribing service polled the first service;

the service to send the portion of the content within the configuration file to the subscribing service if the configuration file was published after the last time that the subscribing service polled the first service.

7. The computing apparatus of claim 6, wherein the syndication feed is an Atom feed.

8. The computing apparatus of claim 6, further comprising: the service to push the configuration file to the one or more subscribers of the syndication feed upon receiving the configuration file.

9. The computing apparatus of claim 8, wherein the first service uses an extensible messaging and presence protocol (XMPP) and an XMPP publish-subscribe extension protocol to transport the configuration file.

10. The computing apparatus of claim 6, wherein all services of the class of services within a distributed system subscribe to the syndication feed.

11. A non-transitory computer readable medium including instructions that, when executed by a processing device, cause the processing device to perform a method comprising:

obtaining, by the processing device, a configuration file, wherein at least a portion of content within the configuration file is published to a syndication feed and wherein the configuration file and the syndication feed are associated with a class of services in a distributed computing system;

sending, by the processing device, the portion of the content within the configuration file to subscribers of the syndication feed, wherein the subscribers comprise one or more services associated with the class of services and wherein the portion of the content within the configuration file causes the subscribers to be reconfigured;

receiving a query from a service that subscribes to the syndication feed; and sending the portion of the content within the configuration file to the service in response to the query if the configuration file is different from an existing configuration file used by the service.

12. The non-transitory computer readable medium of claim 11, wherein the syndication feed is an Atom feed.

13. The non-transitory computer readable medium of claim 11, the method further comprising:

pushing the configuration file to the one or more subscribers of the syndication feed upon receiving the configuration file.

14. The non-transitory computer readable medium of claim 13, wherein the processing device uses extensible messaging and presence protocol (XMPP) and an XMPP publish-subscribe extension protocol to transport the configuration file.

15. The non-transitory computer readable medium of claim 11, wherein all services of the class of services within a distributed system subscribe to the syndication feed.

16. A computer implemented method, comprising:

subscribing to a syndication feed associated with a class of services by a first service that belongs to the class of services;

receiving a configuration file from a second service that hosts the syndication feed, wherein at least a portion of content within the configuration file is published to the syndication feed;

reconfiguring, by a processing device, the first service based on the portion of content within the configuration file; and polling the second service to determine if any configuration file has been published since a last time that the second service was polled, wherein the configuration file is received from the second service if the configuration file was published after the last time that the second service was polled.

17. A non-transitory computer readable medium including instructions that, when executed by a processing device, cause the processing device to perform a method comprising:

subscribing to a syndication feed associated with a class of services by a first service that belongs to the class of services;

receiving a configuration file from a second service that hosts the syndication feed, wherein at least a portion of content within the configuration file is published to the syndication feed;

reconfiguring, by the processing device, the first service based on the portion of content within the configuration file; and polling the second service to determine if any configuration file has been published since a last time that the second service was polled, wherein the configuration file is received from the second service if the configuration file was published after the last time that the second service was polled.

* * * * *